United States Patent [19]
Hirukawa

[11] Patent Number: 5,627,693
[45] Date of Patent: May 6, 1997

[54] ADDRESS MARK DETECTION SYSTEM FOR A MAGNETIC DISK DRIVE

[75] Inventor: Takashi Hirukawa, Tokyo, Japan

[73] Assignee: NEC Corporation, Japan

[21] Appl. No.: 449,774

[22] Filed: May 24, 1995

[30] Foreign Application Priority Data

May 26, 1994 [JP] Japan .................................. 6-112913

[51] Int. Cl.⁶ .............................. G11B 5/09; G11B 5/596
[52] U.S. Cl. .............................. 360/49; 360/40; 360/78.14
[58] Field of Search .................................. 360/40, 48, 49, 360/78.14

[56] References Cited

U.S. PATENT DOCUMENTS

| 4,984,100 | 1/1991 | Takayama et al. | 360/49 |
| 5,047,877 | 9/1991 | Herting | 360/49 |

Primary Examiner—Aristotelis Psitos
Assistant Examiner—Regina Y. Neal
Attorney, Agent, or Firm—Hayes, Soloway, Hennessey, Grossman & Hage, P.C.

[57] ABSTRACT

In a magnetic disk drive of the type using data erase portions as address marks, an address mark detection system has an address mark detecting circuit and a read data masking circuit. The detecting circuit, monitoring a read data signal, becomes active on detecting a data erase portion whose duration is shorter than a predetermined period of time for address mark detection. The detecting circuit is cleared on detecting a data input. The masking circuit, receiving the read data signal, masks any suitable number of read data pulses input immediately after the detecting circuit has been cleared. As a result, even when noise is introduced in the data erase portion, the system prevents the resulting false read data pulses from being output.

1 Claim, 3 Drawing Sheets

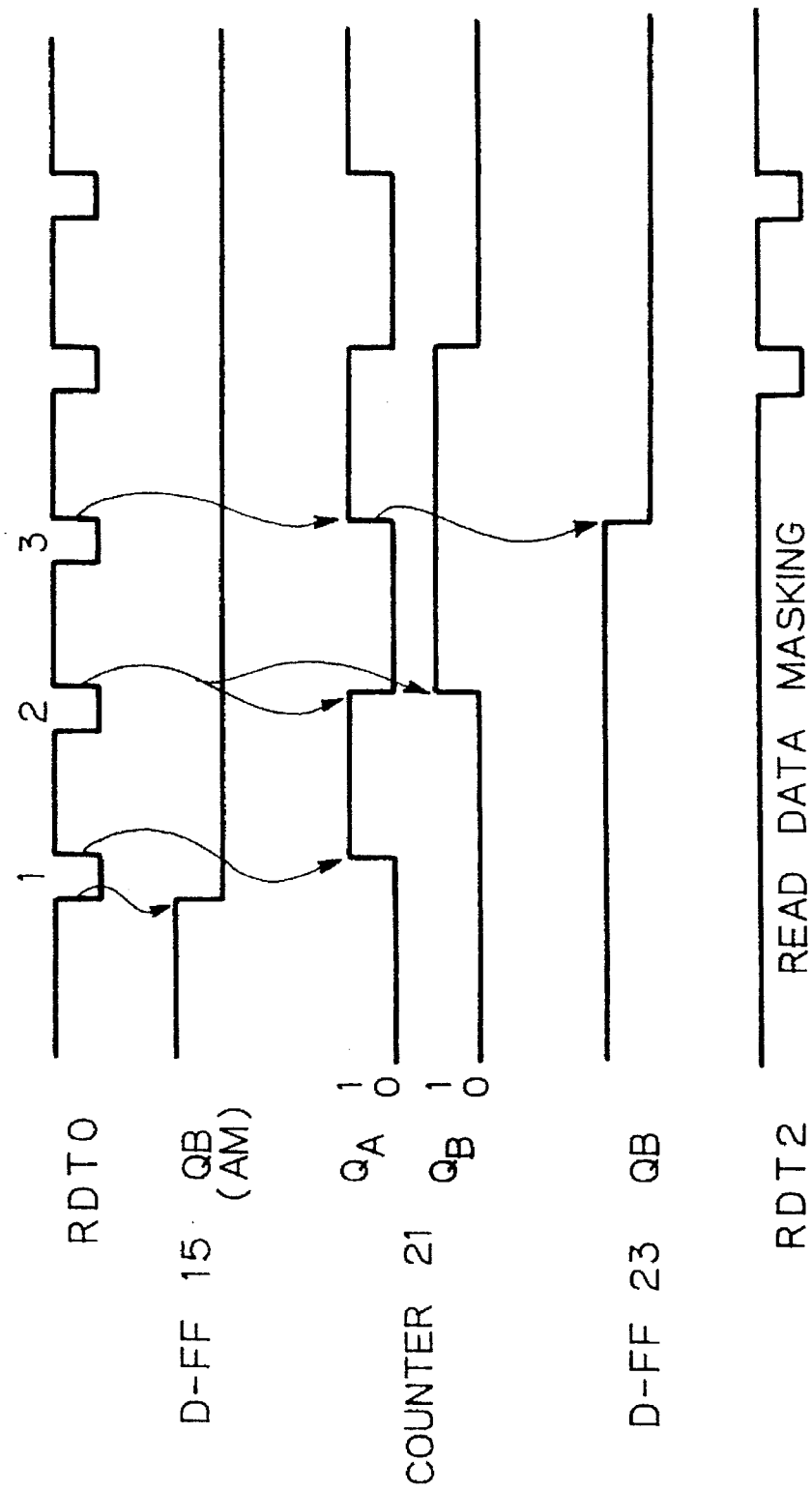

5,627,693

ADDRESS MARK DETECTION SYSTEM FOR A MAGNETIC DISK DRIVE

BACKGROUND OF THE INVENTION

The present invention relates to an address mark detection system for a magnetic disk drive and for finding the head of a read data signal and, more particularly, to an address mark detection system which uses data erase portions as address marks and ensure accurate detection against noise introduced in the erase portions.

In a magnetic disk drive extensively used with personal computers and other data processing devices, the head of each read data signal is recognized on the basis of an address mark. It is a common practice to implement the address mark as a DC-magnetized data erase portion. This conventional scheme, however, has a drawback that when noise is introduced in data erase portions, false read data pulses are generated and obstruct the accurate detection of address marks.

In light of the above, there has been proposed a address mark detection system which counts the duration of a data erase portion and determines, only when it exceeds a predetermined duration, that an address mark has been found. Another system proposed in the past determines that an address mark has been found only when, after the above duration of a data erase portion, a plurality of read data pulses appear continuously for more than a predetermined period of time. On the other hand, Japanese Patent Laid-Open Publication No. 1-122077 discloses a system which causes a counter to output a carry on counting N longer than the duration of a read data pulse and thereby detects an address mark. This system, therefore, does not detect an address mark in the event of noise shorter than the count N. However, this kind of approach is not applicable to a magnetic disk drive of the type rising data erase portions as address marks.

SUMMARY OF THE INVENTION

It is, therefore, an object of the present invention to provide an address mark detection system for a magnetic disk drive and capable of detecting address marks accurately despite noise introduced in data erase portions.

An address mark detection system for a magnetic disk drive and for detecting an address mark by detecting a data erase portion continuing for a predetermined period of time has an address mark detecting circuit and a read data masking circuit. The detecting circuit, monitoring a read data signal, becomes active on detecting a data erase portion whose duration is shorter than the predetermined period of time, and is cleared on detecting a data input. The masking circuit masks any suitable number of read data pulses of the read data signal appeared immediately after the detecting circuit has been cleared.

BRIEF DESCRIPTION OF THE DRAWINGS

The above and other objects, features and advantages of the present invention will become more apparent from the following detailed description taken with the accompanying drawings in which:

FIG. 3 is a timing chart demonstrating how the embodiment masks read data after the detection of the address mark.

DESCRIPTION OF THE PREFERRED EMBODIMENT

Figure 1:
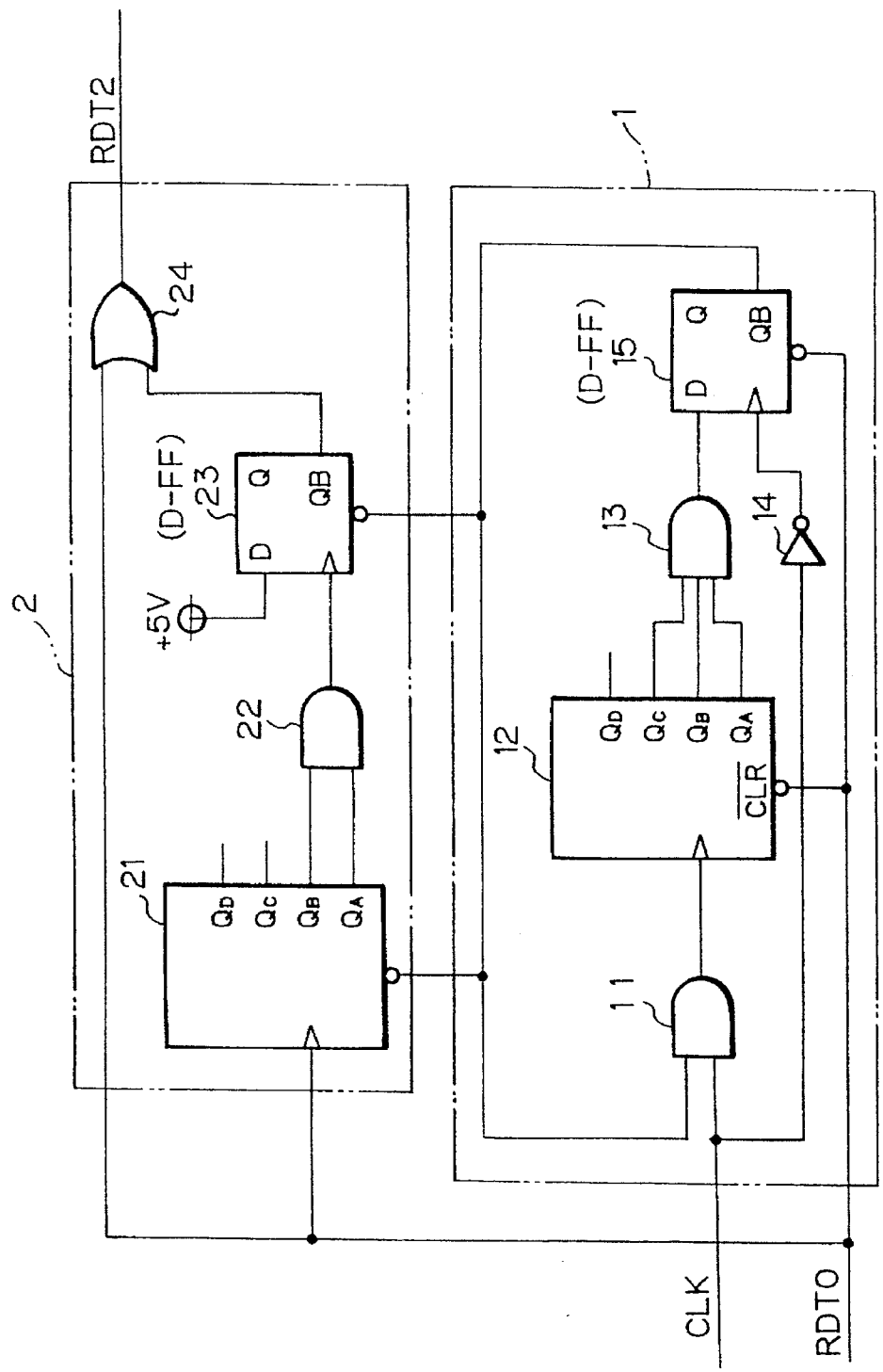
FIG. 1 is a block diagram schematically showing an address mark detection system embodying the present invention.

Referring to FIG. 1 of the drawings, an address mark detection system embodying the present invention is shown. As shown, the system is generally made up of an address mark (AM) detecting circuit 1 and a read data masking circuit 2.

The AM detecting circuit 1 includes an AND gate 11 to which a clock Signal CLK is constantly applied. Also applied to the AND gate 11 is an AM detection signal AM. A four-bit counter 12 counts the outputs of the AND gate 11. An input read data signal RDTO is coupled to the counter 12 and clears the counter 12 when it goes low. The counter 12 has output terminals $Q_A$, $Q_B$ and $Q_C$ respectively connected to three input terminals of an AND gate 13. When the output of the counter 12, appearing on the terminals $Q_A$, $Q_B$ and $Q_C$, reaches "7", the output of the AND gate 13 goes high. An inverter 14 inverts the clock signal CLK and applies the inverted signal to a D-type flip-flop 15. The output of the AND gate 13 is input to the data terminal D of the flip-flop 15 while the output of the inverter 14 is set on the clock terminal of the same. In response, the flip-flop 15 outputs the above-mentioned detection signal AM on a terminal QB. The flip-flop 15 is also cleared when the read data signal RDT0 goes low. In this configuration, if the read data signal RDT0 is not input to the circuit 1 when more than seven clock pulses CLK are input, the detection signal AM goes high.

The read data masking circuit 2 has a four-bit counter 21 which is clocked by the input read data signal RDT0. The detection signal AM clears the counter 21 when it goes high. When the output of the counter 21, appearing on terminals $Q_A$ and $Q_B$ reaches "3", it causes the output of an AND gate 22 to go high. A D-type flip-flop 23 receives a voltage of +5 V at a data terminal D and receives the output of the AND gate 22 at a clock terminal. In response, the flip-flop 23 produces an output on a terminal QB. The flip-flop 23 is cleared when the detection signal AM goes low. An OR gate 24 produces an output read data signal RDT2 in response to the input read data signal RDT0 and the output QB of the flip-flop 23. In this condition, after the detection signal AM has gone high, the circuit 1 masks the output read data signal RDT2 until the input read data signal RDT0 reaches a count "3".

Figure 2:
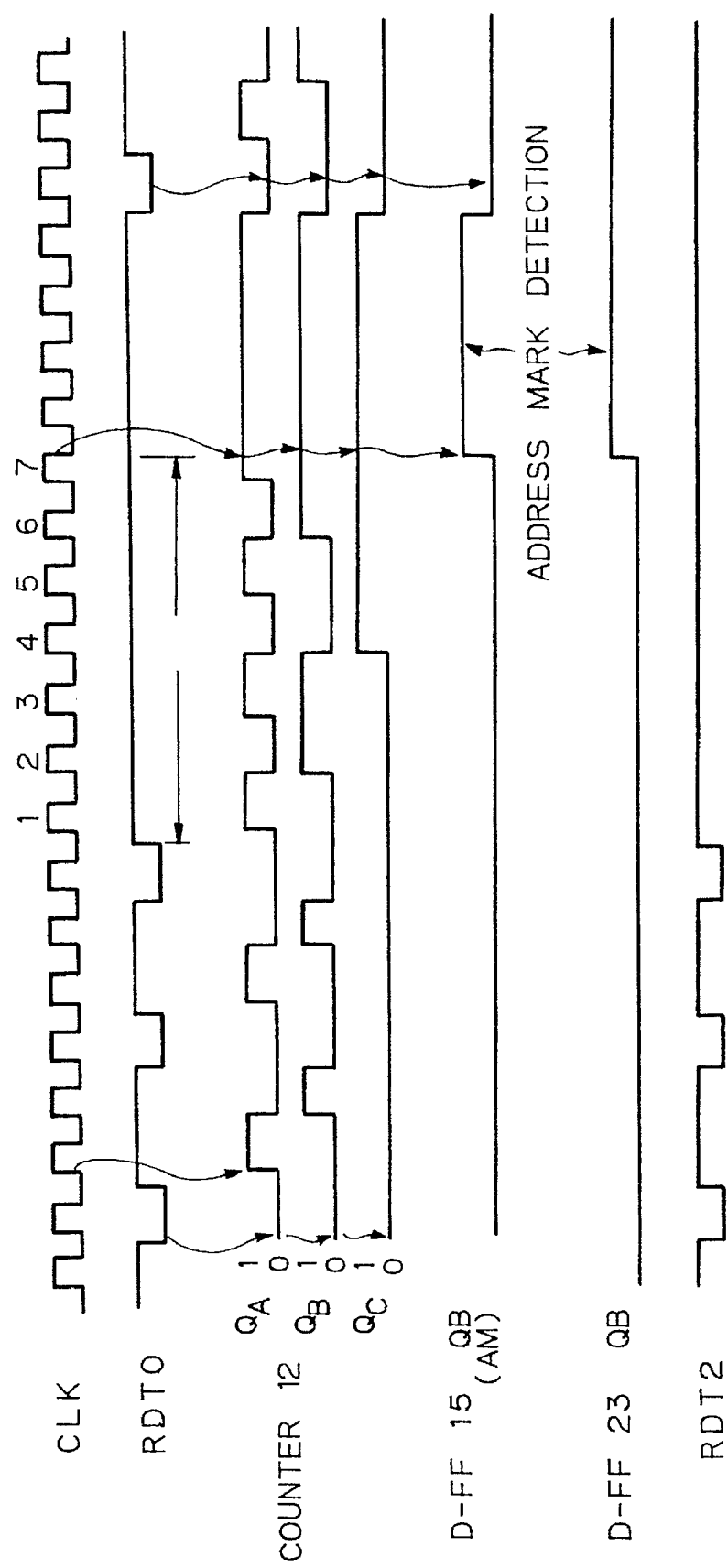
FIG. 2 is a timing chart demonstrating how the embodiment detects an address mark.

The AM detecting circuit 1 monitors the level of the input read data signal RDT0. As shown in FIG. 2, assume that the signal RDT0 does not go low for a period of time T shorter than a predetermined period of time usually used to detect an address mark, i.e., even after seven clock pulses CLK have been input to the counter 12, FIG. 1, as counted from the leading edge of the signal RDT0. Then, the AM detection signal AM goes high. It is to be noted that the period of time T shorter than the usual address mark detection time is longer than the maximum bit cell time.

More specifically, as shown in FIG. 2, the counter 12 is cleared when the input read data signal RDT0 is in a low level, When the QB output of the flip-flop 15, i.e., the detection signal AM is in a high level, the counter 12 counts up continuously in synchronism with the clock signal CLK until the next low level of the signal RDT0 arrives. When the signal RDT0 goes low, the flip-flop 15 is cleared (QB= ZERO). On receiving a clock pulse CLK (opposite phase) when the output of the AND gate 13 is in a high level, the QB output goes high (QB=ONE). When the QB output of the, flip-flop 15 is in a high level, the output of the AND gate 11 is in a low level with the result that the counter 12 does not count up. Assuming that the QB output of the flip-flop 23 is initially in a low level, RDT2=RDT0 holds when the QB output of the flip-flop 15 is in a low level. As a result, the output read data signal RDT2 is output via the OR gate 24 without being masked.

As shown in FIG. 3, in the read data masking circuit 2, the QA and QB outputs of the counter 21 remain in a low level when the QB output of the flip-flop 15, i.e., the detection signal AM is in a high level. As a result, the QB output of the flip-flop 23 remains in a high level. The counter 21 counts up the pulses of the input read data signal RDT0 appearing after the signal AM has gone low. When the counter 21 counts three consecutive low levels of the signal RDT0, the QB output of the flip-flop 23 goes low. When the QB output of the flip-flop 23 is in a high level, the OR gate 24 masks the signal RDT0. The resulting signal is produced as an output, read data signal RDT2. Further, when the QB output of the flip-flop 23 is in a low level, the signal RDT0 is directly output as a signal RDT2 via the OR gate 24.

In summary, it will be seen that the present invention provides an address mark detection system capable of preventing, when noise is introduced in a data erase portion, the resulting false read data pulses from being output by masking them. Hence, a magnetic disk drive using the system of the invention can detect address marks accurately and perform stable reading and writing operations.

Various modifications will become possible for those skilled in the art after receiving the teachings of the present disclosure without departing from the scope thereof,

What is claimed is:

1. An address mark detection system for a magnetic disk drive and for detecting an address mark by detecting a data erase portion continuing for a predetermined period of time, said system comprising:

address mark detecting means for monitoring a read data signal, and becoming active on detecting a data erase portion whose duration is shorter than the predetermined period of time, and being cleared on detecting a data input, said address mark detecting means comprising:

(a) a first counter for counting a period of time over which a low level of the read data signal is not input; and (b) a first D-type flip-flop for outputting a detection signal remaining in a high level from a time when said first counter counts up a predetermined period of time to a time when a low level of the read data signal is input; and read data masking means for masking any suitable number of read data pulses of the read data signal appeared immediately after said address mark detecting means has been cleared, said read data masking means comprising:

(a) a second counter for counting the read data pulses input after an end of a high level period of said detection signal;

(b) a second D-type flip-flop changing an output from a high level to a low level when said second counter counts up a predetermined period of time, or changing said output from a low level to a high level when said detection signal goes high; and (c) an OR gate for masking the read data signal when the output of said second D-type flip-flop is in a high level.

\* \* \* \* \*